March 20, 1945.　　　G. R. TREMOLADA　　　2,371,856
HYDRAULIC BRAKE WITH MECHANICAL FOLLOW-UP
Filed Aug. 23, 1943　　　3 Sheets-Sheet 1

Inventor:
GUGLIELMO R. TREMOLADA,
By

Attorney.

March 20, 1945.   G. R. TREMOLADA   2,371,856
HYDRAULIC BRAKE WITH MECHANICAL FOLLOW-UP
Filed Aug. 23, 1943   3 Sheets-Sheet 2

Inventor:
GUGLIELMO R. TREMOLADA,
By
Attorney.

March 20, 1945. G. R. TREMOLADA 2,371,856
HYDRAULIC BRAKE WITH MECHANICAL FOLLOW-UP
Filed Aug. 23, 1943 3 Sheets-Sheet 3
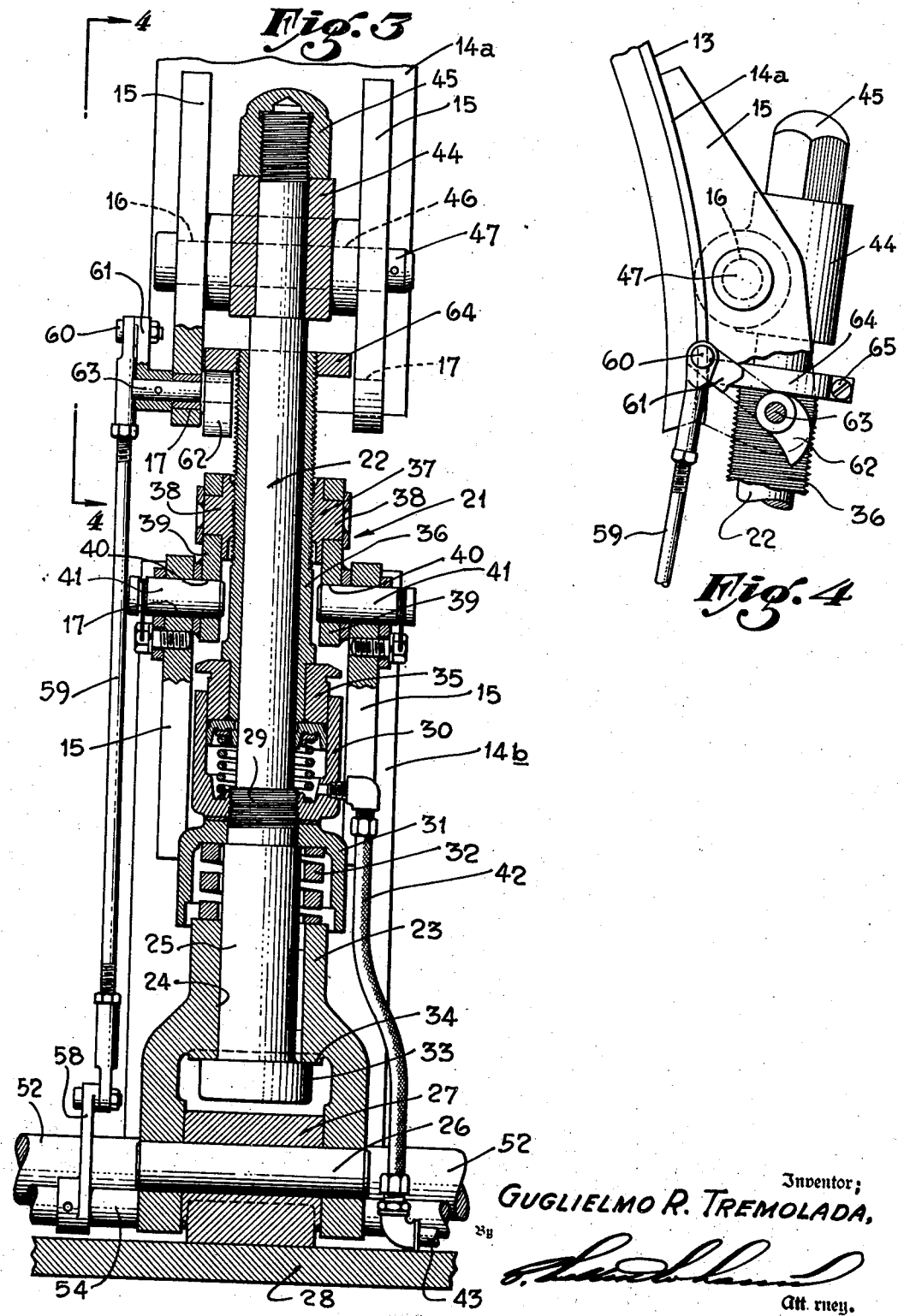
Inventor:
GUGLIELMO R. TREMOLADA,
By
Attorney.

Patented Mar. 20, 1945

2,371,856

UNITED STATES PATENT OFFICE 2,371,856

HYDRAULIC BRAKE WITH MECHANICAL FOLLOW-UP

Guglielmo R. Tremolada, Los Angeles, Calif., assignor to Emsco Derrick & Equipment Company, Los Angeles, Calif., a corporation of California Application August 23, 1943, Serial No. 499,621

16 Claims. (Cl. 188—151)

This application is a continuation-in-part of my copending application, Serial No. 360,346, filed October 9, 1940, for Brake, now Patent #2,331,517, Oct. 12, 1943, and relates to heavy duty hydraulic brakes of the type used in the drawworks of rotary well drilling equipment.

It is an object of the invention to provide a hydraulic brake of simple durable and efficient character having supplementary or auxiliary mechanical means for operation of the brake should there at any time be a failure of the hydraulic actuating means.

It is a further object of the invention to provide a heavy duty hydraulic brake of the character herein set forth, having supplementary or auxiliary operating means which functions in parallel relation to and through movement of the same operating mechanism or lever used for the operation of the hydraulic means of the brake.

A further object is to provide a brake wherein the kick-back resulting from premature engagement of the drive clutch of the drawworks, or for any other reason, is absorbed or relieved so that the kick-back force will not be transmitted through the handle to the hand of the operator, this brake device having a mechanical follow-up actuating means which is operated by the handle through which pressure is applied to the hydraulic means of the brake device.

A further object is to provide a cam acting between parts of the brake device which are respectively connected to the live end and the dead end of the brake band, which cam is adapted to apply to these parts a force which will close the brake band around the brake drum, and linkage and leverage means to connect the cam with a member which moves in cooperative relation to a movable part of the hydraulic brake actuating mechanism, so that in event of a failure of the hydraulic mechanism this member will be engaged and the cam will be actuated through the mechanism which ordinarily transmits from the hand of the operator the force to produce hydraulic pressure for operation of the hydraulic means of the brake device.

Further objects and advantages of the invention will be brought out in the following part of the specification.

Referring to the drawings which are for illustrative purposes only,

Fig. 3 is an enlarged sectional view taken as indicated by the arrow 3—3 of Fig. 2.

Fig. 4 is an enlarged fragmentary view taken as indicated by the arrow 4—4 of Fig. 3.

Figure 1:
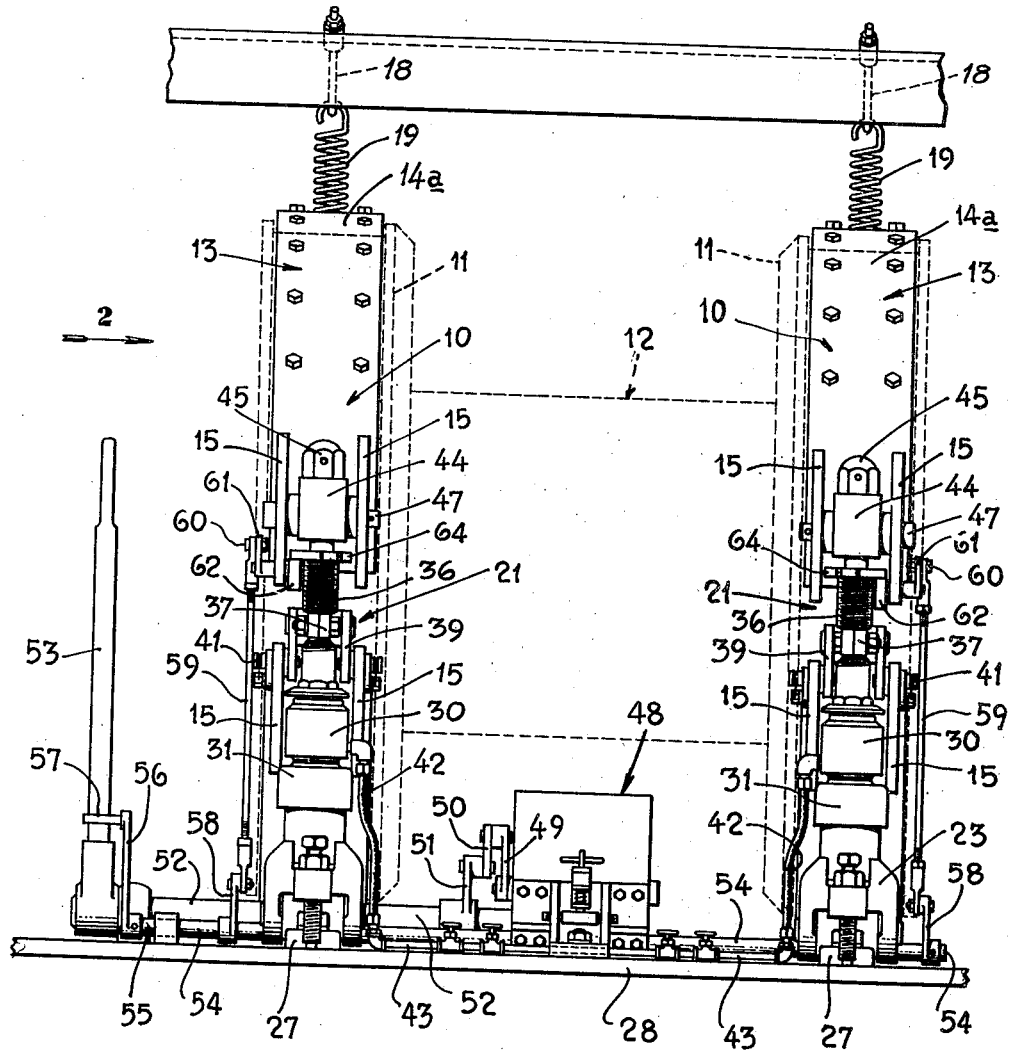
Figure 1 is a front elevation of a brake device embodying my present invention.
Figure 1:

In Fig. 1 by use of dotted lines I have shown brake drums 11 formed at the ends of a cable spool 12 of a drawworks. The brake device 10 used with this spool 12 comprises a pair of brake bands 13 to cooperate with the two drums and mechanism for simultaneously constricting the bands 13 around the drums 11 so that the desired frictional retarding or stopping force will be applied thereto.

Figure 2:
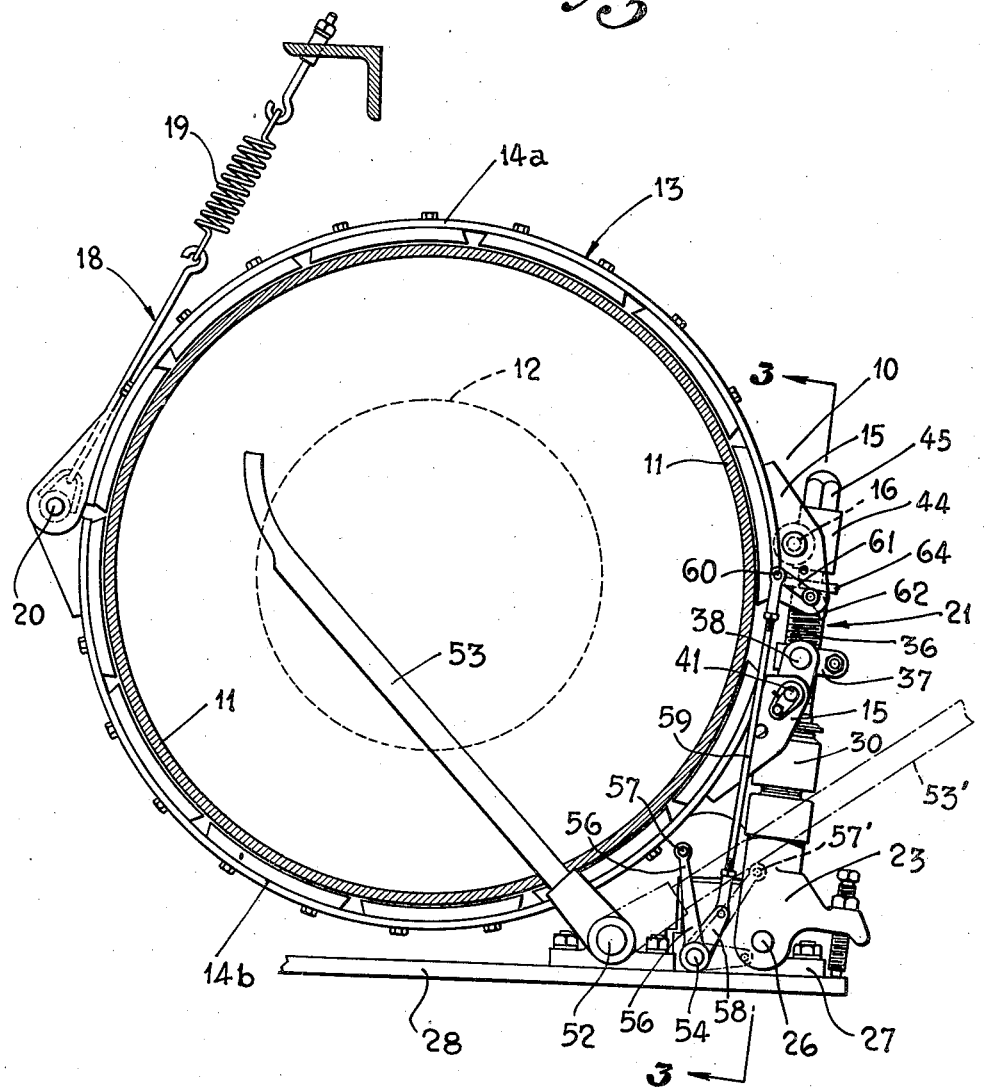
Fig. 2 is a side elevation looking toward Fig. 1 as indicated by the arrows 2 therein.

As shown in Fig. 2, each brake band 13 has an upper section 14a and a lower section 14b, these sections being nearly semi-circular and being duplicates. They are joined together to form the complete brake band 13 by a hinge 20 resiliently supported by adjustable suspension means 18 which includes a spring 19 and is disposed in an upwardly and forwardly sloping position for a purpose which will be hereinafter described. At the forward ends of the brake bands 14a and 14b, there is a pair of projecting plates 15, each of these plates having an inner opening 16 and an outer opening 17. At the front end of each brake band 13 there is a brake operating means 21, as shown in Fig. 1. These brake operating means are substantially duplicates and therefore the following detailed description of a single one of them will serve for both. Each brake operating means 21 includes a guide 22 arranged so that it will have small movement towards and away from the front face of the drum 11. As best shown in Fig. 3, it consists of a bar supported in upright position by means of a fitting 23, having an opening 24 to slidably receive the lower end 25 of the bar 22. This fitting 23 is carried by a pin 26 which is supported by a bracket 27 which is secured to the floor plate 28 of the rotary drawworks.

Above its lower end 25, the bar 22 has threads 29 for securement of a hydraulic cylinder 30, the upper end of which is opened and the lower end of which is closed and holds a downwardly faced cup 31 against the upward force of a heavy spring 32, which normally holds the head 33 at the lower end of the bar 22 upward against a shoulder 34 formed on the fitting 23 at the lower end of the opening 24.

Slidable in the cylinder 30 there is a piston 35 of annular form which surrounds a portion of the bar 22 and has a sleeve 36 projecting upwardly therefrom, which sleeve 36 is slidable on the upper portion of the bar 22 and is threaded so as to carry adjustably thereon a nut 37 having diametrally opposed trunnions 38 from which links 39 are suspended. These links 39 lie between the plates 15 at the front end of the lower band section 14b and have openings 40 therein to receive the inner ends of diametrally aligned pins 41, which are extended inwardly through the openings 17 of the plates 15, thereby connecting the sleeve 36 and the piston 35 to the front end of the lower band section 14b so that when hydraulic pressure is applied within the cylinder 30 to the lower face of the piston 35, the upward movement of the piston 35 will be transmitted to the front end of the lower band section 14b, causing the band 13 to be constricted around the drum 11. Flexible conduit 42 and associated fittings connect the cylinder 30 with a hydraulic piping system 43.

The front end of the upper band section 14a is held against upward movement by connection to the upper end of the bar 22 consisting of a swivel fitting 44 held turnably upon the upper end of the bar 22 by a nut 45 and having a transverse bore 46 through which a pin 47 is passed, this pin also extending through the openings 16 of the plates 15 at the forward end of the upper band section 14a.

The hydraulic piping system 43 is connected to a hydraulic pressure applying device or master cylinder 48 having an actuating lever 49, as shown in Fig. 1, which lever 49 is connected by a link 50 to a lever 51 which is fixed on a horizontal shaft 52 arranged to be rotated by a manually operable lever 53 disposed at a side of the drawworks drum. When the lever 53 is swung from the position in which it is shown in Fig. 2 in full lines toward the dotted line position 53' thereof, the pressure applying device 48 will be actuated through rotation of the shaft 52 and movement of the lever 51, link 50, and lever 49, to force hydraulic fluid under pressure through the piping system 43, and the flexible conduit 42, to the cylinders 30 of both brake operating devices 21, thereby moving the front ends of the lower band sections 14b upward and constricting the brake bands 13 around the respective drums 11.

Parallel to the shaft 52 I extend a shaft 54 which is of such length that it passes beyond each side of the brake structure as shown in Fig. 1. On the front end 55 of the shaft 54 an operating lever 56 is fixed, this lever 56 having a portion 57 lying in the path of movement of the lever 53. Shorter levers 58 are fixed on the shaft 54 adjacent each of the brake operating means 21, and from the swinging end of these levers 58 a link 59 is extended upward, and each link 59 has its upper end connected through pivot means 60 to a lever 61 adapted to actuate a cam 62.

As shown in Figs. 3 and 4, each lever 61 is fixed on the outer end of a short shaft 63 which extends through the opening 17 in a plate 15 at the front end of an upper brake band section 14a. The cam 62 which cooperates with each lever 61 is fixed on the inner end of the shaft 63 to which the lever 61 is secured. Each cam 62 is arranged to cooperate with a cam follower consisting of a ring 64 which is threaded on the upper end of the sleeve 36. The ring 64 is radially slit at one side and a clamping screw is extended across this slit for the purpose of clamping the ring against rotation when it has been screwed to the desired position on the upper end of the sleeve 36.

The face of the cam 62 is so formed that when the lever 61 is swung downward from the position thereof shown in Figs. 3 and 4, the ring 64 will be lifted, and this upward movement of the ring 64 will be transmitted through the sleeve 36 and the links 39 to the front end of the lower band section 14b, thereby constricting the brake band 13 so that it will frictionally engage its cooperating drum 11. Furthermore, the weight of the link 59 tends to rotate the lever 61 downward, thereby holding the cam 62 against the lower face of the ring 64, so that when this ring 64 is raised and lowered during the normal operation of the brake operating mechanism 21 through the use of the hydraulic means previously described, the link 59 will rise and fall, and this movement of the link 59 will be transmitted through the lever 58 and the shaft 54 to the lever 56. For example, when the manually operable lever 53, Fig. 2, is swung forward or rightward from its full line position, hydraulic pressure in the cylinders 30 will force the pistons 35 upward to produce the described brake applying action. At the same time, the rings 64 will be moved upward by the sleeves 36, permitting a rising movement of the cams 62 and a dropping movement of the levers 61 and 58 which will produce a rightward movement of the lever 56. It will be perceived, accordingly, that the levers 53 and 56 will have the same movement insofar as direction is concerned during the normal hydraulic operation of the brake apparatus. The cam 62 is so formed that the lever 56 will always move ahead of the lever 53 during the normal hydraulic operation of the brake device. When the lever 53 is moved into the position 53' to apply the brakes hydraulically to their fullest extent, the engageable portion 57 of the lever 56 will be in a position indicated by dotted lines 57' spaced a short distance, for example, one-eighth or one-quarter of an inch, from the lever 53 occupying the position 53'. Should there be at this time, or at any other time, a failure of the hydraulic system, the lever 53 will be moved into engagement with the engageable portion 57 of the lever 56 and movement will be transmitted directly from the lever 53 to the lever 56 under force applied manually by the brake operator. This movement will be carried through the levers 58, links 59, and levers 61 to the cam 62, which will force the rings 64 upward, lifting the sleeves 36 and thereby transmitting brake operating movement and force to the forward ends of the lower brake band sections 14b, and thereby close the brake bands 13 around the drums 11.

Although the cams 62 are mounted on plates 15 which are secured to the front ends of the upper band sections 14a, these cams are in effect mounted on the upper ends of the guide bars 22, since the plates 15 are connected by the pins 47 and the swivel fittings 44 to the upper ends of the bars 22. Therefore, my invention provides two means mounted on each bar 22 for closing the associated brake band 13, one of these means being the hydraulic cylinder and piston arrangement comprising members 30 and 35, and the other means comprising the cam 62 and the lever and shaft means for transmitting force and movement to the cam 62.

I claim as my invention:

1. In a brake device for the spool of a drawworks having brake drums at the ends thereof, the combination of: brake band means around each of said drums, each of said band means having ends spaced apart and being adapted for movement toward each other so as to constrict the band means; a pair of guide members, each of which is disposed adjacent a face of one of said drums and in cooperative relation to said ends of one of said band means; a pair of connecting means on each of said guide members, connected respectively to said ends of said band means; hydraulic means for moving said connecting means relatively toward each other so that closing movement will be applied to said ends of said band means; mechanical means for moving said connecting means relatively toward each other so that closing movement may be applied to said ends of said band means in event of failure of said hydraulic means; mechanism for operating said hydraulic means, said mechanism having a lever; a shaft extending across a face of said spool; means for transmitting operating movement from said shaft to said mechanical means; and means for transmitting operating movement from said lever to said shaft.

2. In a brake device for the spool of a drawworks having brake drums at the ends thereof, the combination of: brake band means around each of said drums, each of said band means having ends spaced apart and being adapted for movement toward each other so as to constrict the band means; a pair of guide members, each of which is disposed adjacent a face of one of said drums and in cooperative relation to said ends of one of said band means; a pair of connecting means on each of said guide members, connected respectively to said ends of said band means; hydraulic means for moving said connecting means relatively toward each other so that closing movement will be applied to said ends of said band means; mechanical means for moving said connecting means relatively toward each other so that closing movement may be applied to said ends of said band means in event of failure of said hydraulic means; mechanism for operating said hydraulic means, said mechanism having a lever; a shaft extending across a face of said spool; means for transmitting operating movement from said shaft to said mechanical means; and lever means on said shaft having a part in the path of movement of said lever whereby operating movement may be transmitted from said mechanism to said shaft.

3. In a brake device for the spool of a drawworks having brake drums at the ends thereof, the combination of: brake band means around each of said drums, each of said band means having ends spaced apart and being adapted for movement toward each other so as to constrict the band means; a pair of guide bars, one each of which is disposed adjacent a face of one of said drums and substantially tangential to a circle concentric with the drum, said bars being supported so as to be movable toward and away from said drums and occupying positions in cooperative relation to the ends of said band means; a pair of connecting means on each of said guide bars, each of said connecting means comprising an anchored connecting means and a movable connecting means, connected respectively to said ends of said band means; hydraulic means for moving said movable connecting means toward said anchored connecting means so that closing movement will be applied to said ends of said band means; and mechanical means for moving said movable connecting means toward said anchored connecting means so that closing movement may be applied to said ends of said band means in event of failure of said hydraulic means.

4. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; and mechanical means for duplicating said relative movement of said body and said guide member to constrict said band in event of failure of said hydraulic means.

5. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; a cam operative between said guide member and said body to produce relative movement of said body and said first connecting means whereby said band will be constricted; and a single means for actuating both said hydraulic means and said cam.

6. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; a cam operating between said guide member and said body to produce relative movement of said body and said first connecting means whereby said band will be constricted; and a single means for actuating both said hydraulic means and said cam, said single means being disposed so as to first actuate said hydraulic means and then, in event of failure of said hydraulic means, to actuate said cam.

7. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member; whereby said body and said first connecting means will be moved relatively toward each other to constrict said band; mechanical means for duplicating said relative movement of said body and said guide member to constrict said band in event of failure of said hydraulic means; means for actuating said hydraulic means comprising a movable part which moves when operating force is applied to said hydraulic means; and a movable part through which operating force is transmitted to said mechanical means, said last named part being placed so as to be engaged and moved by said movable part of said hydraulic means when said failure of said hydraulic means occurs.

8. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; a cam operative between said guide member and said body to produce relative movement of said body and said first connecting means whereby said band will be constricted; a first shaft having means for connecting it operatively to said hydraulic means; a lever for rotating said shaft; a second shaft having means for transmitting rotation to said cam; and a second lever mounted on said second shaft so as to occupy a position in the path of movement of said first named lever, whereby, in event of failure of said hydraulic means, said first named lever will engage and move said second lever, thereby rotating said cam.

9. In a brake device for the spool of a drawworks having brake drums at the ends thereof, the combination of: brake band means around each of said drums, one end of each of said band means being anchored and the other end thereof being movable toward the anchored end; hydraulic means for moving the movable ends of said brake band means toward said anchored ends so as to apply the brakes; and mechanical means for applying said brakes in event of failure of said hydraulic means, said mechanical means comprising levers on the anchored ends of said brake band means, means for moving said levers, and means for transmitting movement from said levers to the movable ends of said band means.

10. In a brake device for the spool of a drawworks having brake drums at the ends thereof, the combination of: brake band means around each of said drums, one end of each of said band means being anchored and the other end thereof being movable toward the anchored end; hydraulic means for moving the movable ends of said brake band means toward said anchored ends so as to apply the brakes; and mechanical means for applying said brakes in event of failure of said hydraulic means, said mechanical means comprising levers on the anchored ends of said brake band means, means for simultaneously applying a force to said levers to move the same, cams on said anchored ends of said band means actuated by the movement of said levers, and means for transmitting movement from said cams to said movable ends of said band means.

11. In a brake device of the character described, for use with a brake drum, the combination of: a band surrounding said drum, said band having ends lying in adjacent relation at the front of said drum; a supporting member extending across the front of said drum; first connecting means to connect one of said ends of said band to said supporting member; a body movable along said supporting member; second connecting means to connect said body to the other of said ends of said band; hydraulic means for producing relative movement of said body and said supporting member, whereby said body and said first connecting means will be moved relatively toward each other to constrict said band; a cam operative between said supporting member and said body to produce relative movement of said body and said first connecting means whereby said band will be constricted; and a single means for actuating both said hydraulic means and said cam.

12. In a brake device of the character described, for use with a brake drum, the combination of: a band surrounding said drum, said band having ends lying in adjacent relation at the front of said drum; a supporting member extending across the front of said drum; first connecting means to connect one of said ends of said band to said supporting member; a body movable along said supporting member; second connecting means to connect said body to the other of said ends of said band; hydraulic means for producing relative movement of said body and said supporting member, whereby said body and said first connecting means will be moved relatively toward each other to constrict said band; a cam operating between said guide member and said body to produce relative movement of said body and said first connecting means whereby said band will be constricted; and a single means for actuating both said hydraulic means and said cam, said single means being disposed so as to first actuate said hydraulic means and then, in event of failure of said hydraulic means, to actuate said cam.

13. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member; whereby said body and said first connecting means will be moved relatively toward each other to constrict said band; mechanical means for substantially duplicating said relative movement of said body and said guide member to constrict said band in event of failure of said hydraulic means; means for actuating said hydraulic means comprising a movable part which moves when operating force is applied to said hydraulic means; and means for transmitting operating movement from said movable part to said mechanical means whereby said mechanical means will constrict said band in event of failure of said hydraulic means.

14. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; mechanical means operating between said guide member and said body to produce relative movement of said body and said first connecting means whereby said band will be constricted; and a single means for actuating both said hydraulic means and said mechanical means, said single means being disposed so as to actuate said hydraulic means and said mechanical means in close sequence so that in event of failure of said hydraulic means, said mechanical means will produce brake constricting relative movement of said body and said first connecting means.

15. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; mechanical means operative between said guide member and said body to produce relative movement of said body and said first connecting means whereby said band will be constricted; and a single means for actuating both said hydraulic means and said mechanical means.

16. In a brake device for the spool of a drawworks having brake drums at the ends thereof, the combination of: brake band means around each of said drums, each of said band means having ends spaced apart and being adapted for movement toward each other so as to constrict the band means; a pair of guide members, each of which is disposed adjacent a face of one of said drums and in cooperative relation to said ends of one of said band means; a pair of connecting means on each of said guide members, connected respectively to said ends of said band means; hydraulic means for moving said connecting means relatively toward each other so that closing movement will be applied to said ends of said band means; and mechanical means connected to said guide means and one of said connecting means for moving said connecting means relatively toward each other so that closing movement may be applied to said ends of said band means in event of failure of said hydraulic means.

GUGLIELMO R. TREMOLADA.